(12) United States Patent
Hutter et al.

(10) Patent No.: US 10,911,221 B2
(45) Date of Patent: *Feb. 2, 2021

(54) MEMORY OPTIMIZATION FOR NESTED HASH OPERATIONS

(71) Applicant: Cryptography Research, Inc., Sunnyvale, CA (US)

(72) Inventors: Michael Hutter, Vienna (AT); Matthew Pond Baker, San Francisco, CA (US)

(73) Assignee: Cryptography Research, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/656,286

(22) Filed: Oct. 17, 2019

(65) Prior Publication Data

US 2020/0127815 A1  Apr. 23, 2020

Related U.S. Application Data

(63) Continuation of application No. 15/603,342, filed on May 23, 2017, now Pat. No. 10,454,670.

(60) Provisional application No. 62/348,399, filed on Jun. 10, 2016.

(51) Int. Cl.
*G06F 21/00* (2013.01)
*H04L 9/06* (2006.01)
*G09C 1/00* (2006.01)

(52) U.S. Cl.
CPC ............. *H04L 9/0643* (2013.01); *G09C 1/00* (2013.01)

(58) Field of Classification Search
CPC .......... H04L 9/0643; H04L 9/06; G06F 21/72
See application file for complete search history.

(56) References Cited

U.S. PATENT DOCUMENTS

| | | | |
|---|---|---|---|
| 5,623,545 A | 4/1997 | Childs et al. | |
| 6,091,821 A | 7/2000 | Buer | |
| 6,829,355 B2 | 12/2004 | Lilly | |
| 6,842,860 B1* | 1/2005 | Branstad | H04L 9/12 713/166 |
| 7,142,669 B2 | 11/2006 | Dworkin et al. | |
| 7,213,148 B2 | 5/2007 | Anand | |
| 7,249,255 B2 | 7/2007 | Anand | |
| 7,376,685 B2* | 5/2008 | Lee | H04L 9/0643 380/28 |
| 7,400,722 B2 | 7/2008 | Qi et al. | |
| 7,489,779 B2* | 2/2009 | Scheuermann | G06F 9/3879 380/28 |
| 8,275,125 B2 | 9/2012 | Vijayarangan | |
| 8,363,827 B2* | 1/2013 | Yap | H04L 9/0643 380/28 |

(Continued)

*Primary Examiner* — Hosuk Song
(74) *Attorney, Agent, or Firm* — Lowenstein Sandler LLP

(57) ABSTRACT

A first hash value is calculated by using a first input value that is stored in a first set of registers. The first hash value is then stored in a second set of registers. A second input value is stored in the first set of registers after calculating the first hash value. The second hash value is calculated based on the first hash value and the second input value. During the calculating of the second hash value, the first hash value is shifted from the second set of registers to a portion of the first set of registers when the calculating of the second hash value has reached a state where the portion of the first set of registers is no longer used to store the second input value.

20 Claims, 11 Drawing Sheets

(56) References Cited

U.S. PATENT DOCUMENTS

| | | | |
|---|---|---|---|
| 8,447,988 B2* | 5/2013 | Alekseev | H04L 9/0643 |
| | | | 712/221 |
| 8,804,950 B1* | 8/2014 | Panwar | H04L 9/06 |
| | | | 380/28 |
| 8,848,907 B2 | 9/2014 | Fujisaki | |
| 8,856,546 B2 | 10/2014 | Gueron et al. | |
| 9,632,782 B2* | 4/2017 | Yap | G06F 15/8007 |
| 9,960,909 B2 | 5/2018 | Karighattam et al. | |
| 10,454,670 B2* | 10/2019 | Hutter | G09C 1/00 |
| 2009/0141887 A1 | 6/2009 | Yap et al. | |

* cited by examiner

MEMORY OPTIMIZATION FOR NESTED HASH OPERATIONS

RELATED APPLICATION

This application is a continuation of U.S. patent application Ser. No. 15/603,342 filed on May 23, 2017, which claims the benefit under 35 U.S.C. § 119(e) of U.S. Provisional Application 62/348,399 filed on Jun. 10, 2016, each of which is hereby incorporated by reference.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
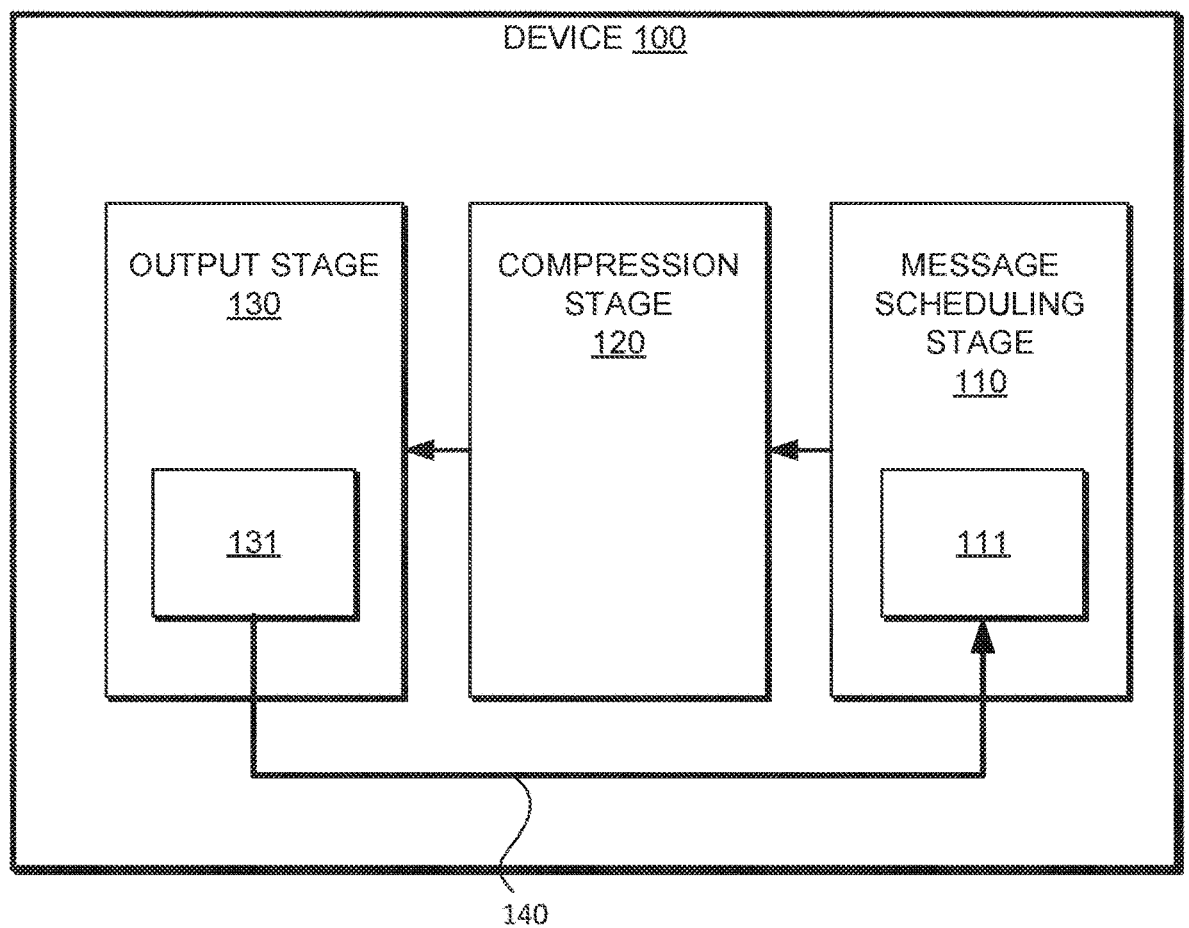
FIG. 1 illustrates an example architecture to implement nested hash operations in accordance with some embodiments.

Aspects of the present disclosure are directed to memory optimization for nested hash operations. In general, the performance of a cryptographic procedure or protocol may use a series of cryptographic hash operations. Such cryptographic procedures or protocols may include, but are not limited to, the Secure Hash Algorithm (SHA) family of cryptographic hash operations (e.g., SHA-1, SHA-224, SHA-256, SHA-384, or SHA-512).

As an example, a cryptographic procedure may be implemented with nested hash operations. A first hash operation (i.e., an inner hash operation) may be performed to generate a first hash value and a second hash operation (i.e., an outer hash operation) may then be performed based on a result of the first hash value to generate a second hash value. An architecture to perform the nested hash operations may be implemented based on multiple stages that include a message scheduling stage, a compression stage, and an output stage.

In operation, a first message may be stored in registers of the message scheduling stage and the first hash operation may be performed with the first message that is stored in the registers to generate a first hash value. Furthermore, the first hash value may then be stored in a buffer memory and a second message may subsequently be stored in the registers of the message scheduling stage. The second hash operation may be performed with the second message that is now stored in the registers of the message scheduling stage and an intermediate hash value may then be stored in registers of the output stage. The first hash value may then be retrieved from the buffer memory and stored in the registers of the message scheduling stage and the second hash operation may proceed with the first hash value now stored in the registers of the message scheduling stage to generate and store the second hash value at the registers of the output stage.

The storing of the first hash value in a buffer memory may require additional memory on an integrated circuit. Aspects of the present disclosure address this and other deficiencies by optimizing the use of the memory corresponding to the registers of the message scheduling stage. For example, the first hash value may be stored in the registers of the output stage until a time during the performance of the second hash operation where a portion of the registers of the message scheduling stage are not used. Thus, the use of an additional buffer memory to store the first hash value for later use during the performance of the second hash operation is not needed.

In operation, a first message may be received and split into multiple first message blocks that are each stored in a separate register of a first set of registers that are part of the message scheduling stage. During the performance of the first hash operation, the first message blocks may be shifted through the first set of registers and are output to the compression stage which may apply a transformation to the received first message blocks during the performance of the first hash operation. The first hash value of the first hash operation may be stored in a second set of registers. Subsequently, a second message may be received and split into multiple second message blocks that are stored in the registers of the first set of registers. A second hash operation may then be performed based on the second message and the first hash value. During the performance of the second hash operation, the second message blocks may be shifted through the first set of registers. At a certain point during the second hash operation, a portion of the first set of registers may not be used during a portion of the second hash operation to store any of the second message blocks. At this point, the first hash value from the second set of registers may be stored into the portion of the first set of registers that are not currently used (e.g., not currently storing other data) by the second hash operation with the second message blocks. New intermediate values corresponding to a second hash value may be stored at the second set of registers and the second hash operation may be completed by proceeding with hash operations with the first hash value that is now stored in the portion of the first set of registers. The final second hash value may then be stored in the second set of registers.

Advantages of the present disclosure thus may provide the nested hash operations without the additional buffer to store the first hash value. Thus, less memory may be used to implement the nested hash operations.

FIG. 1 illustrates an example architecture 100 to implement nested hash operations. In general, the device 100 may be implemented by an integrated circuit such as a system on a chip (SoC). The device 100 may be used to perform hash operations as part of a cryptographic procedure.

As shown in FIG. 1, the device 100 may have an architecture that includes a message scheduling stage 110, a compression stage 120, and an output stage 130. The message scheduling stage 110 may generate a message schedule from a padded message. For example, the message scheduling stage 110 may receive a message (e.g., the first message or the second message) and may split the message into message blocks (e.g., first message blocks or second message blocks). The message blocks may be generated from a padded message. In some embodiments, the padded message may correspond to a received input (e.g., the message) that has additional data appended to the input. For example, the padding of the message may result in each padded message being of the same size or length. The compression stage 120 may apply round transformations to message blocks that are received from the message scheduling stage 110. The output stage 130 may accumulate intermediate hash values that are output from the compression stage 120 until the completion of the hash operations when the output stage 130 may store the final hash value.

The message scheduling stage 110 may include a first set of registers 111 and the output stage 130 may include a second set of registers 131. The first set of registers 111 and the second set of registers 131 may be used to store values used during the performance of nested hash operations (e.g., the first hash operation and the second hash operation).

The cryptographic process may be based on nested hash operations for a SHA-256 process that includes a first hash operation and a second hash operation. The first hash operation may be performed with a first message to generate a first hash value. The second hash operation may be performed with a second message and the first hash value. For example, the second hash operation may first process the second message and then may process the first hash value to generate a second hash value. The SHA-256 hash operations may be used in conjunction with a Keyed-Hash Message Authentication Code (HMAC) process that includes a first hash operation and a second hash operation. The first hash operation (i.e., an inner hash operation) may be performed based on a key that has been padded based on a first scheme (e.g., a first padding value) and a first message to generate a first hash value. A second hash operation (i.e., an outer hash operation) may then be performed based on the key that has been padded based on a second scheme (e.g., a second padding value) and the first hash value.

As described in further detail below, the first hash value may be stored in the second set of registers 131 of the output stage 130 until a time during the second hash operation when a portion of the first set of registers 111 are not being used in conjunction with the key that has been padded based on the second scheme. For example, when the portion of the first set of registers 111 are not being used during the performance of the second hash operation, the first hash value may be transmitted or shifted via the connection 140 from the second set of registers 131 to the first set of registers 111. The second set of registers 131 may then store intermediate hash values of the second hash operation and may subsequently accumulate new values until the second hash operation completes processing the first hash value and stores the second hash value in the second set of registers 131.

Figure 2:
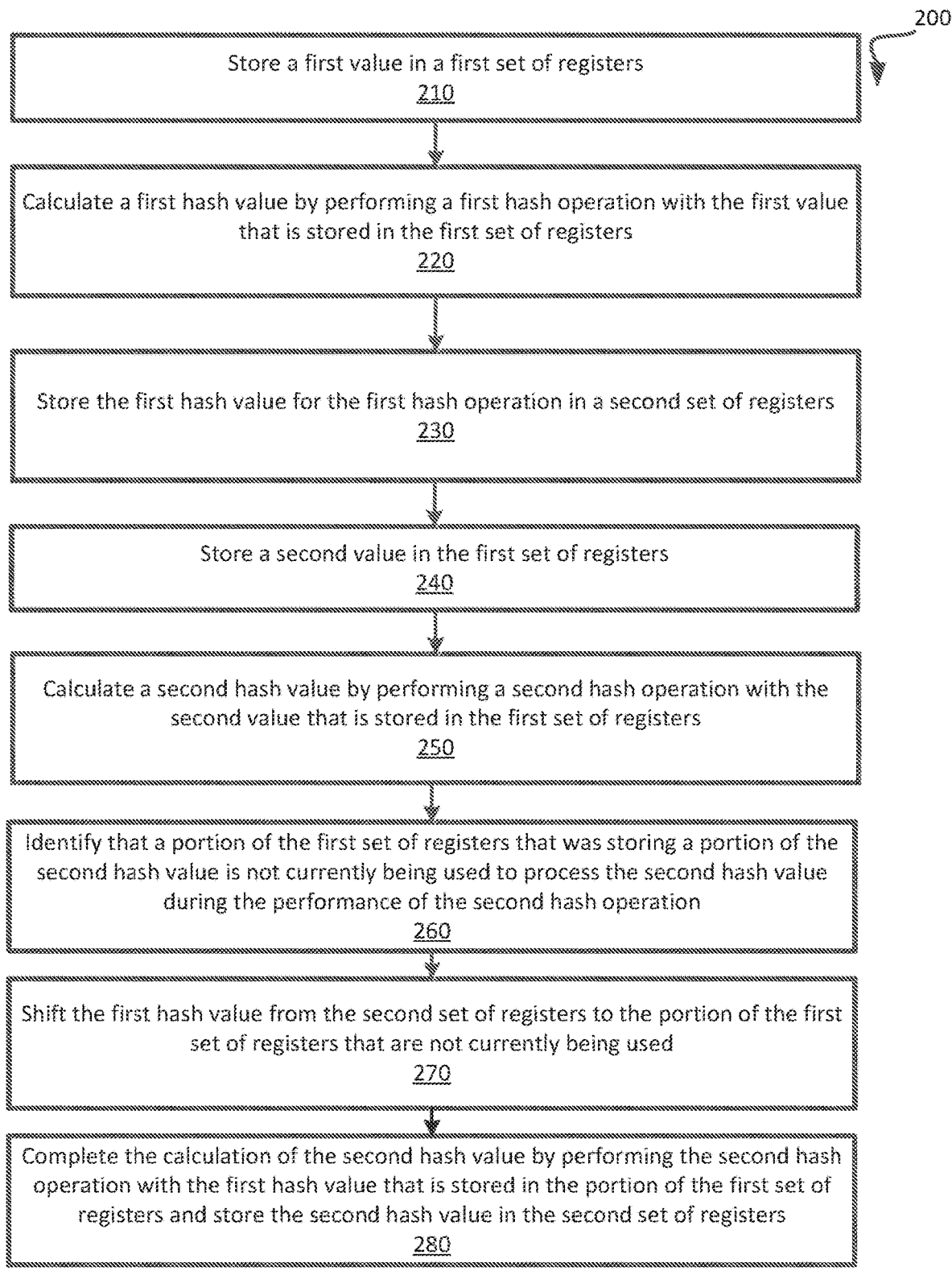
FIG. 2 is a flow diagram of an example method to shift a first hash value from a second set of registers to a first set of registers in accordance with some embodiments of the present disclosure.

FIG. 2 is a flow diagram of an example method 200 to shift a first hash value from a second set of registers to a first set of registers in accordance with some embodiments of the present disclosure. In general, the method 200 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the architecture 100 of FIG. 1.

As shown in FIG. 2, the method 200 may begin with the processing logic storing a first value in a first set of registers (block 210). For example, message blocks corresponding to a padded input message may be stored at the first set of registers of a message scheduling stage. In some embodiments, the first value may correspond to a combination of an input message and a key that has been padded based on a first scheme. The processing logic may subsequently calculate a first hash value by performing a first hash operation with the first value that is stored in the first set of registers (block 220). For example, the message blocks may be shifted through the first set of registers. The processing logic may store a first hash value for the first hash operation in a second set of registers (block 230). For example, the first hash value may be stored in registers of an output stage after being compressed. The processing logic may further store a second value in the first set of registers (block 240). For example, the first set of registers may no longer store the first value and may now store the second value. In some embodiments, the second value may correspond to a second padded message or a combination of the key that has been padded based on a second scheme. The processing logic may calculate a second hash value by performing a second hash operation with the second value that is stored in the first set of registers (block 250). During the performance of the second hash operation, the processing logic may identify that a portion of the first set of registers that was storing a portion of the second value is not currently being processed to calculate the second hash value (block 260). For example, the portion of the first set of registers may not store any message blocks corresponding to the second value after a number of rounds or cycles (e.g., shifts of a message block from one register of the first set of registers to an adjacent register of the first set of registers) of the second hash operation.

Referring to FIG. 2, the processing logic may further shift the first hash value from the second set of registers to the portion of the first set of registers that are not currently being used (block 270). For example, the blocks of the first hash value may be stored in the portion of the first set of registers that are no longer storing blocks of the second value during the processing of the second value to calculate the second hash value. In some embodiments, at this time, the first set of registers may include a portion that does not store any blocks corresponding to the second value and a second portion that does store blocks corresponding to the second value that are to be processed to determine intermediate hash values for calculating the second hash value. The shifting of the first hash value may correspond to copying the first hash value to the portion of the first set of registers and deleting or removing the first hash value from the second set of registers. In some embodiments, the shifting of the first hash value to the portion of the first set of registers may be performed with the further processing of the remaining blocks of the second value that are stored in the other portion of the first set of registers to further update the intermediate hash values. Furthermore, the processing logic may complete the calculation of the second hash value by performing the second hash operation with the first hash value that is stored in the portion of the first set of registers and store the second hash value in the second set of registers (block 280). In some embodiments, the first hash value may be padded by adding the padding data to the other portions of the first set of registers that are not currently storing the blocks of the first hash value and the calculating of the second hash value may further process the padding data.

Figure 3:
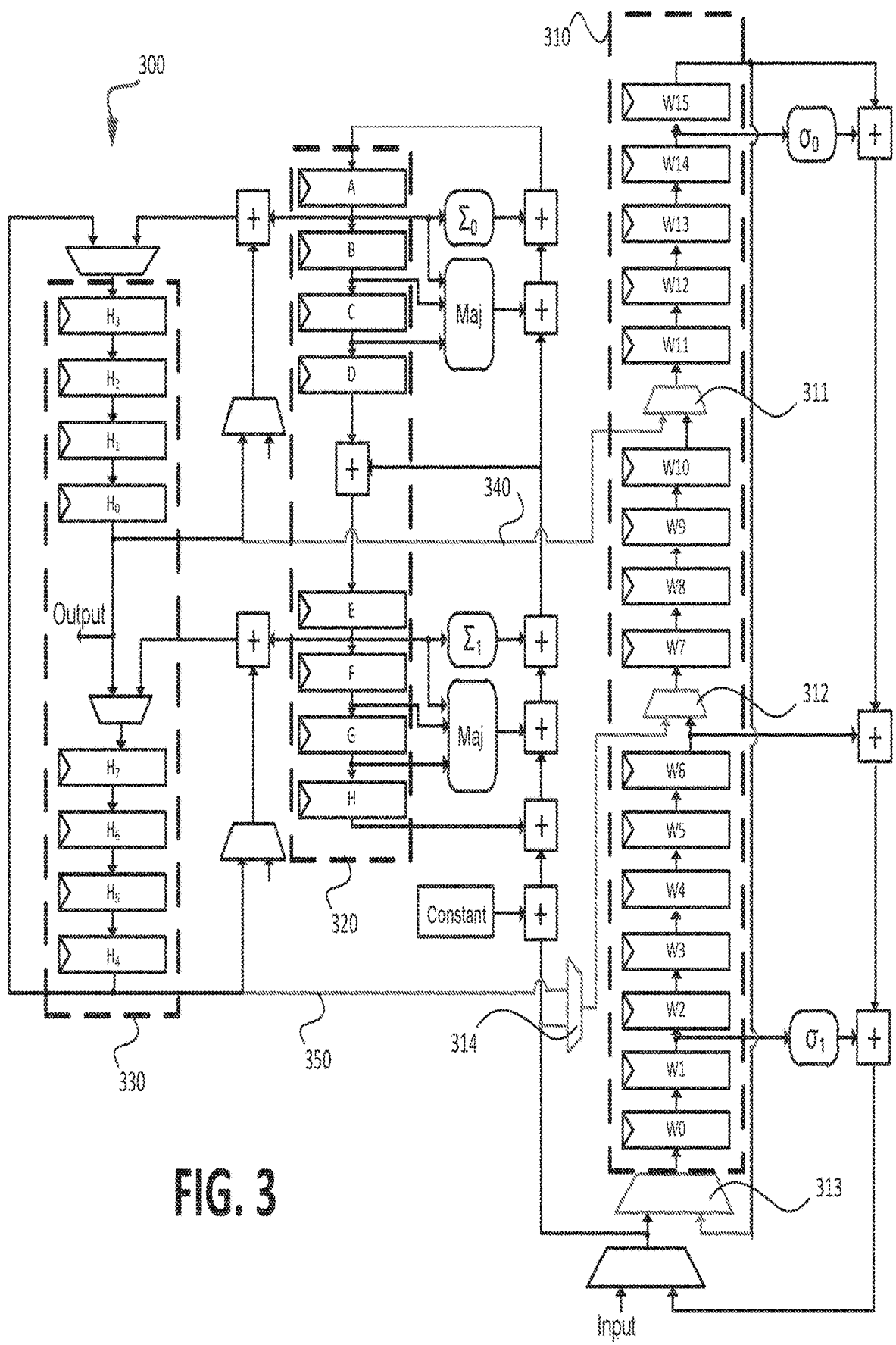
FIG. 3 is a block diagram of an embodiment of an architecture to provide memory optimization for nested hash operations in accordance with some embodiments.

FIG. 3 is a block diagram of an embodiment of an architecture 300 to provide memory optimization for nested hash operations. In general, the architecture 300 may correspond to the architecture of the device 100.

As shown in FIG. 3, the architecture 300 may include a message scheduling stage with message scheduling registers 310, a compression stage with compression registers 320, and an output stage with output registers 330. Data (e.g., blocks of a message) may be transmitted from the message scheduling registers 310 to the compression stage to store values in the compression registers 320. Furthermore, data from the compression registers 320 may be further processed to determine a hash value (e.g., an intermediate hash value, first hash value, or the second hash value) and store the hash value in blocks at the output registers 330.

The architecture 300 may further include selection units or multiplexers 311, 312, 313, and 314 to shift or transfer blocks of data stored at the output registers 330 to the portion of the message scheduling registers 310 that are not being used to store blocks of other data as previously described. For example, blocks from the output registers 330 may be shifted or transmitted to be stored in the portion for the message scheduling registers 310 via the connections 340 and 350.

As an example, blocks of the first hash value may be stored at the output registers 330. When the portion of the message scheduling registers 310 are not being used, the blocks of the first hash value may be transmitted or shifted to the portion of the message scheduling registers 310 that correspond to the registers 'W7' through 'W14.' For example, at a clock cycle, the block of the first hash value stored at the 'H0' may be shifted to the register 'W11' via the connection 340 and the multiplexer 311 and the block of the first hash value stored at the register 114' may be shifted to the register 'W7' via the connection 350 and the multiplexer 312 and 314. Furthermore, the blocks of the remaining registers of the output registers 330 may be shifted to adjacent registers within the output registers 330 (e.g., the data block stored at the register 'H1' is shifted to the register 'H0', the data block stored at the register 112' is shifted to the register 'H1' and so forth). Thus, after four clock cycles, the blocks of the first hash value may be stored in the portion of the message scheduling registers 310 that include the registers 'W7' through 'W14.'

In operation, the multiplexers 311, 312, 313, and 314 may receive enable signals and at least two input signals to provide as an output of the respective multiplexer. For example, when the first hash value is not being shifted from the output registers to the portion of the message scheduling registers, the enable signal may be provided to each of the multiplexers at a first value so that an output of the multiplexer corresponding to blocks of the second hash value are provided as outputs. Otherwise, if the enable signal is at a second value that is different than the first value, then the output of the multiplexer may be different and may correspond to the value of the output registers 330 (e.g., the output of the register 'H0' and the register 'H4'). In some embodiments, the shifting of the blocks of the first hash value may be performed in parallel (e.g., one clock cycle to shift all of the blocks of the first hash value from the output registers 330 to the message scheduling registers 310).

Figure 4A:
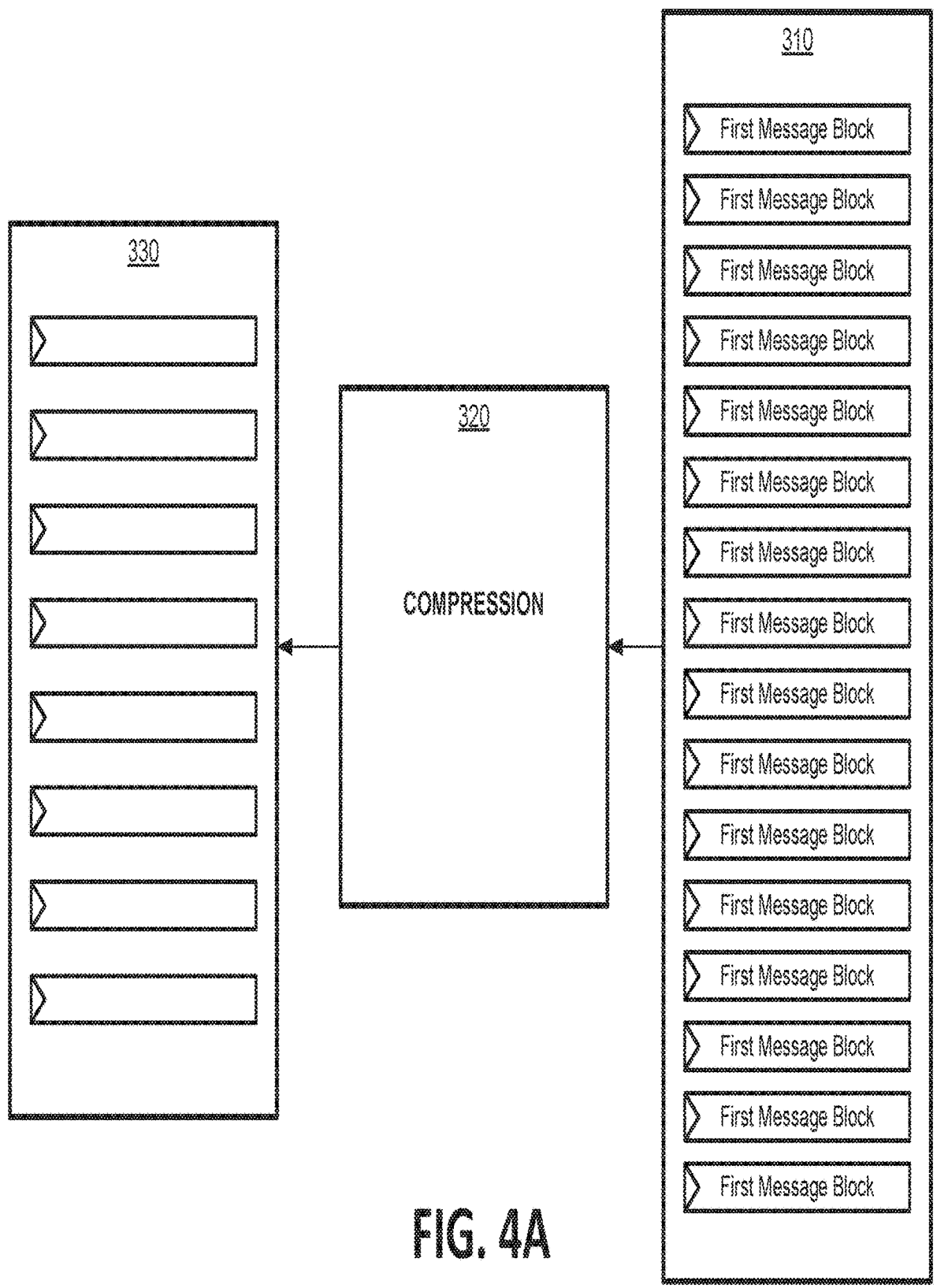
FIG. 4A illustrates an example storing of data in the registers of the architecture in accordance with some embodiments of the present disclosure.

FIG. 4A illustrates an example storing of data in the registers of the architecture. In general, the architecture of FIG. 4A may correspond to the architecture 300 of FIG. 3.

As shown in FIG. 3, at a first time, the message scheduling registers 310 may store multiple first message blocks that may correspond to the first message used in a first hash operation of nested hash operations. For example, the first message may be padded and split into the first message blocks and stored in the message scheduling registers.

Figure 4B:
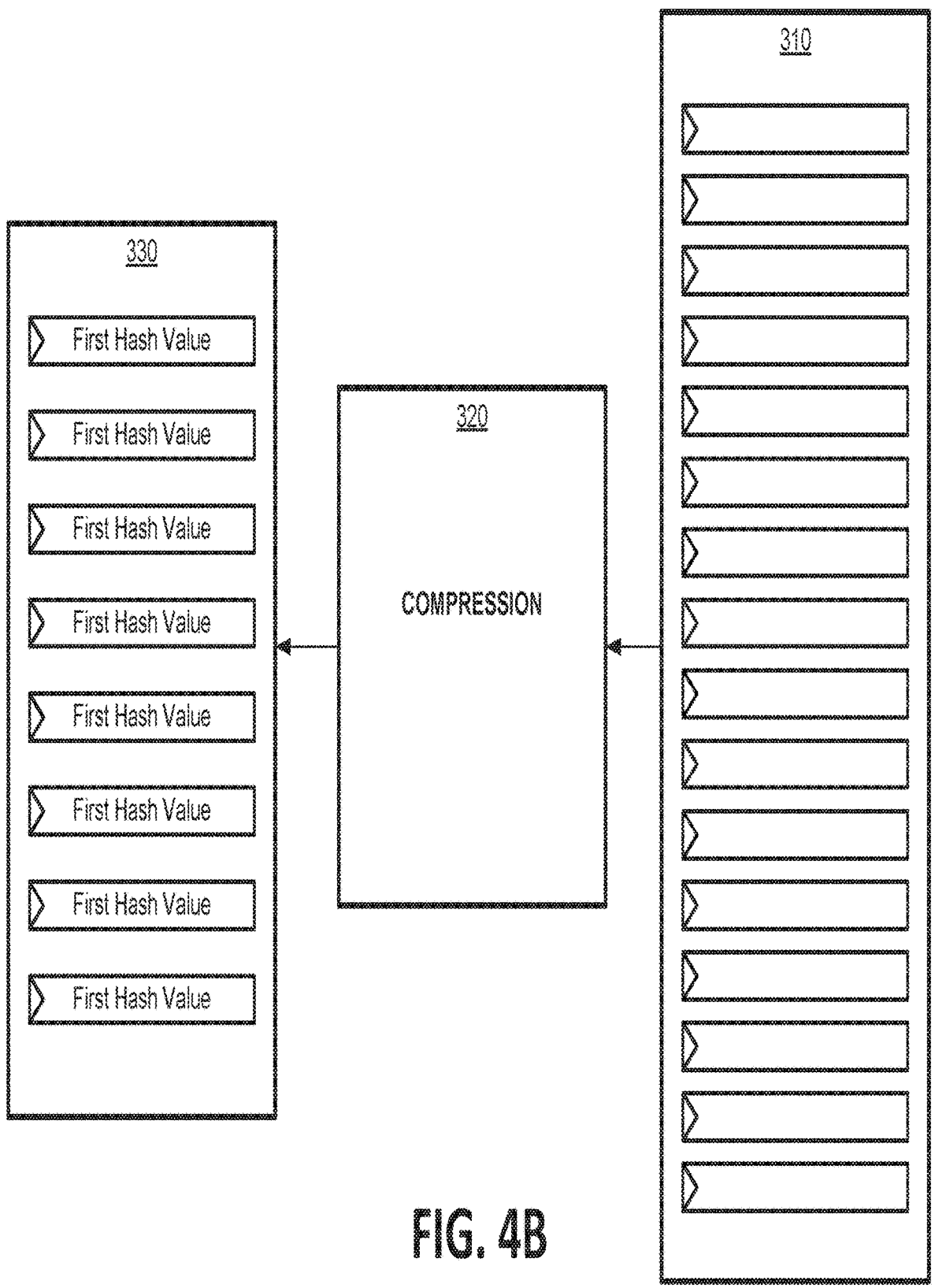
FIG. 4B illustrates an example storing of data at a subsequent time in the registers of the architecture in accordance with some embodiments.
Figure 4C:
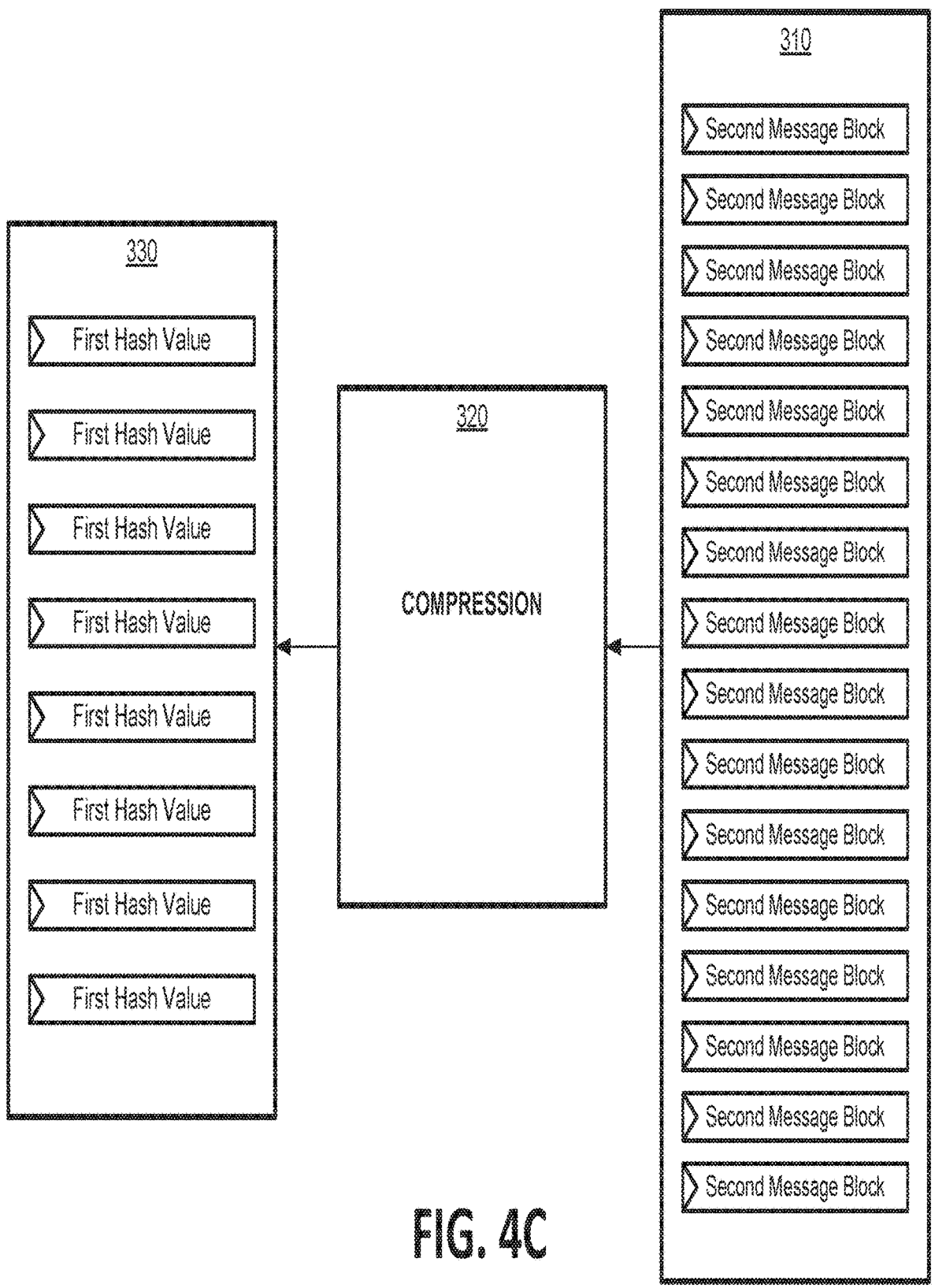
FIG. 4C illustrates an example storing of data at a subsequent time in the registers of the architecture in accordance with some embodiments.
Figure 4D:
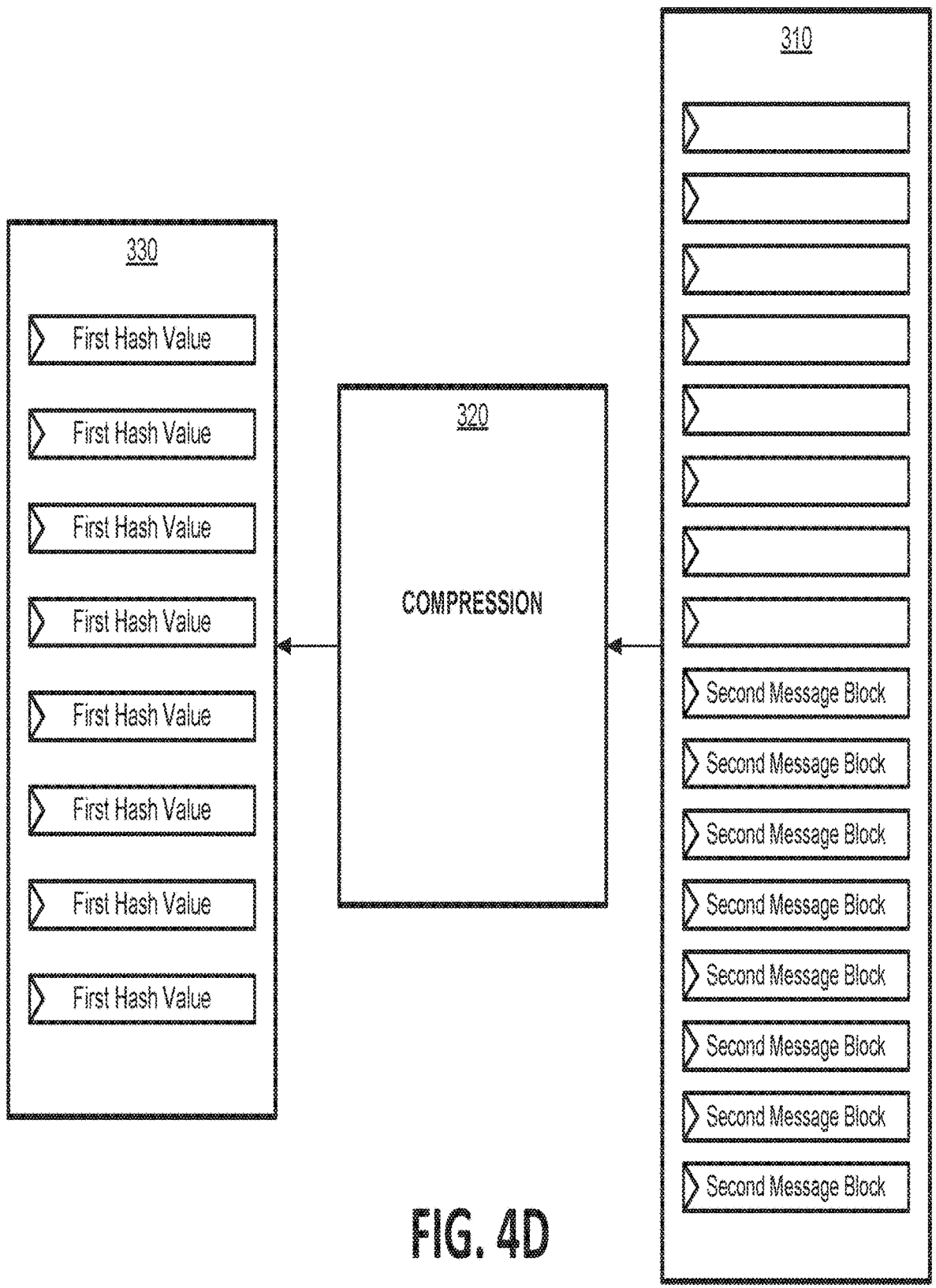
FIG. 4D illustrates an example storing of data at a subsequent time in the registers of the architecture in accordance with some embodiments.
Figure 4E:
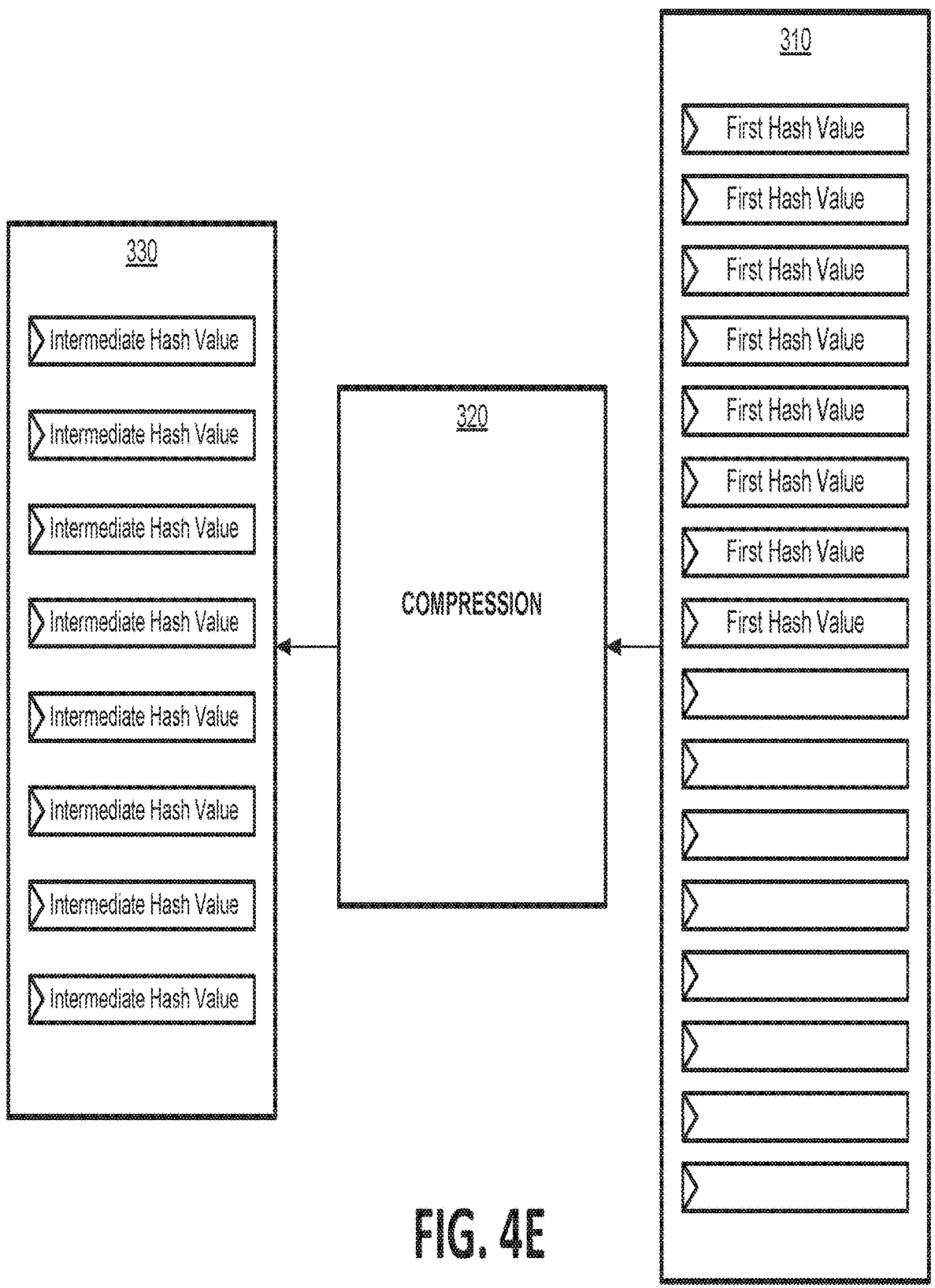
FIG. 4E illustrates an example of shifting of data between registers of the architecture in accordance with some embodiments of the present disclosure.
Figure 4F:
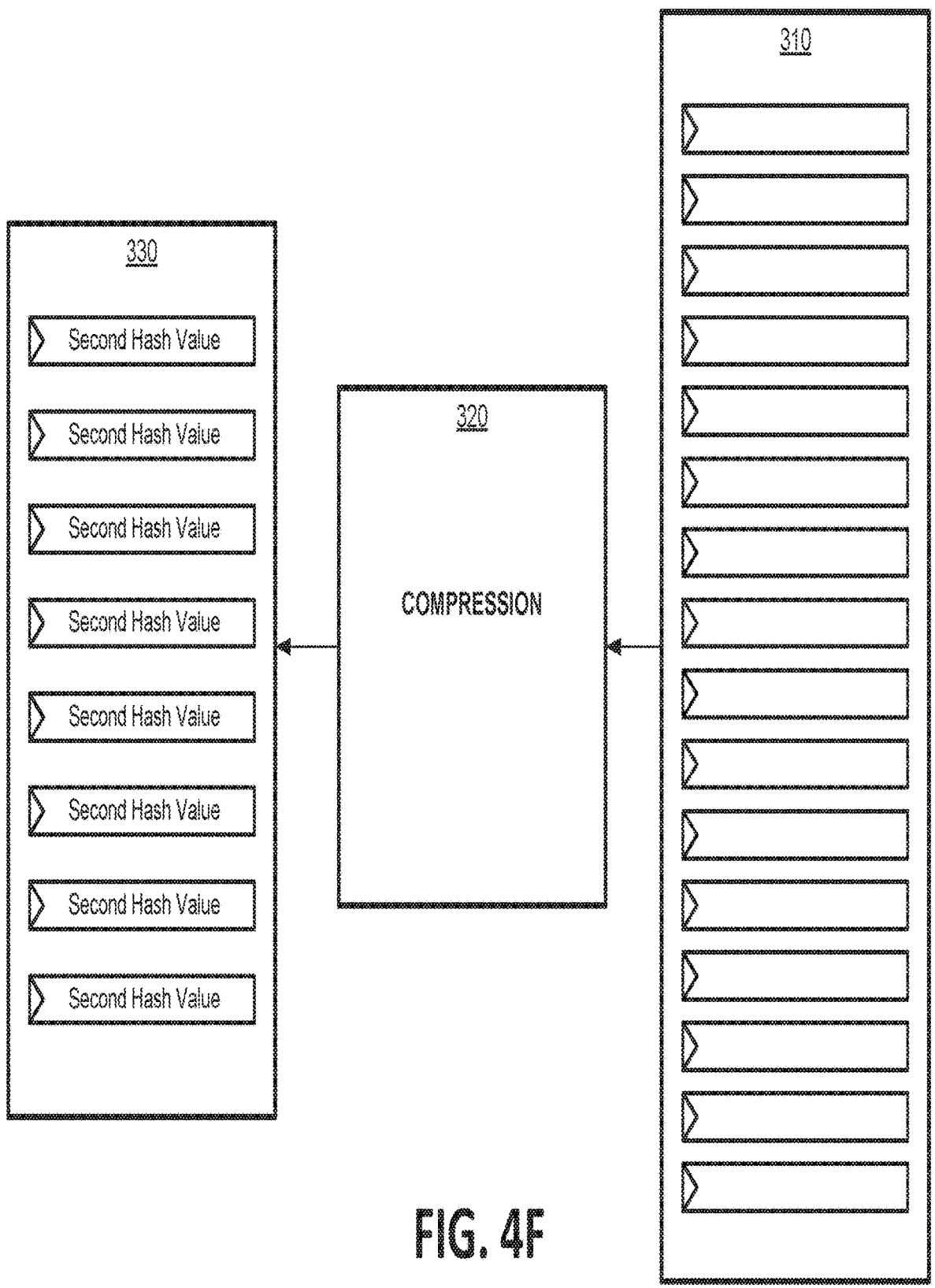
FIG. 4F illustrates an example of the storing of a final data value in the registers of the architecture in accordance with some embodiments.

FIG. 4B illustrates an example storing of data at a subsequent time in the registers of the architecture. In general, the architecture of FIG. 4B illustrates the storing of data after the performance of a hash operation with the first message blocks of FIG. 4A. For example, as shown, the first hash value may be processed by the message scheduling stage and the compression stage 320 and may be stored in the output registers 330. FIG. 4C illustrates the storing of second message blocks after the storing of the first hash value in the output registers 330. For example, the first hash value may be stored in the output registers 330 while the second message blocks are stored in the message scheduling registers 310. FIG. 4D illustrates an example storing of data at a subsequent time in the registers of the architecture when portions of the second message blocks are stored in the registers of the compression stage 320. As shown, a portion of the message scheduling blocks 310 are not storing any data or other blocks and the other portion of the message scheduling blocks 310 are storing second message blocks. FIG. 4E illustrates an example of shifting of data between registers of the architecture. For example, as shown, the first hash value may be shifted from the output registers 330 to the message scheduling registers 310. Furthermore, during the processing of the second hash operation with the second message blocks, intermediate hash values may be stored or accumulated in the output registers 330. Subsequently, FIG. 4F illustrates that the second hash value may be stored in the output registers 330 after the processing of the first hash value by the second hash operation. For example, the first hash value may be padded (e.g., padding data may be stored in the other registers of the message scheduling registers 330) and the second hash operation may process the padded first hash value via the compression stage 320 to generate the second hash value.

Figure 5:
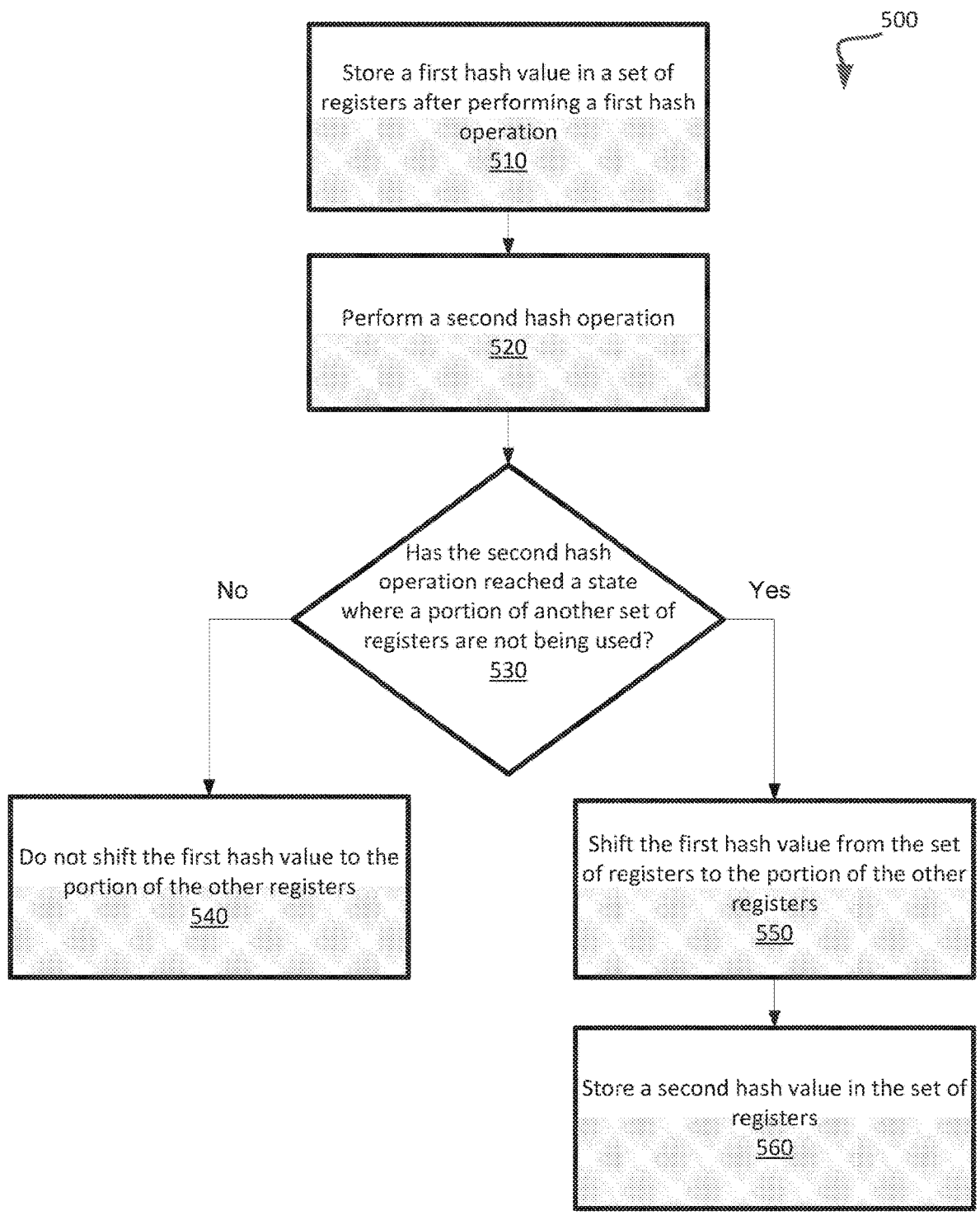
FIG. 5 illustrates a flow diagram of an example method to shift a first hash value to another set of registers in accordance with some embodiments of the present disclosure.

FIG. 5 illustrates a flow diagram of an example method 500 to shift a first hash value to another set of registers. In general, the method 500 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 may be performed by the device 100 of FIG. 1.

As shown in FIG. 5, the method 500 may begin with the processing logic storing a first value in a set of registers after performing a first hash operation (block 510). For example, the first value may be a first hash value that is calculated from a first message that is split into blocks that are stored in message scheduling registers. The processing logic may further perform a second hash operation (block 520). For example, a second message may be split into blocks and stored in another set of registers that previously stored blocks of the first message that were used to calculate the first hash value. Subsequently, the processing logic may determine whether the second hash operation has reached a state where a portion of the other set of registers are not being used (block 530). For example, a portion of the message scheduling registers may not store the second message blocks. If the second hash operation has not reached the state where the portion of the other set of registers are being used (e.g., the portion of the message scheduling registers still include at least one of the second message blocks), then the processing logic may not shift the first hash value to the portion of the other registers (block 540). Otherwise, if the second hash operation has reached the state where the portion of the other set of registers are no longer being used (e.g., the portion of the message scheduling registers does not include at least one of the second message blocks), then the processing logic may shift the first hash value from the set of registers to the portion of the other registers (block 550). For example, an enable signal may be provided to multiplexers to provide for the shifting of the first hash value as previously described. Furthermore, the processing logic may store a second hash value in the set of registers (block 560). For example, the second hash value may be calculated with the shifted first hash value and then stored in the set of registers that was previously storing the first hash value before the shifting of the first hash value.

Figure 6:
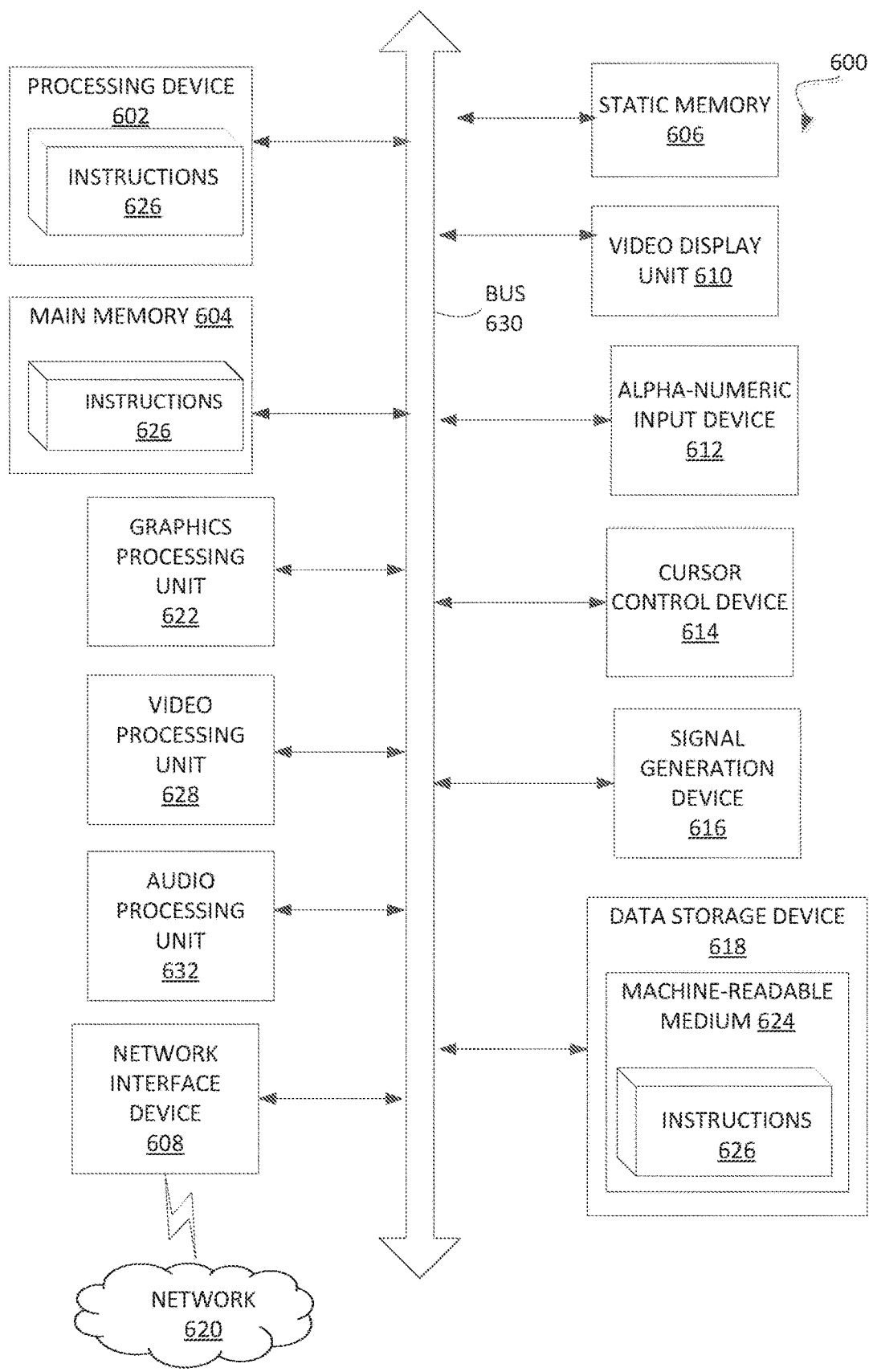
FIG. 6 illustrates a block diagram of an embodiment of a computer system in which some embodiments of the disclosure may operate.

FIG. 6 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one implementation, the instructions 626 include instructions to implement functionality corresponding to the components of a device (e.g., device 100 of FIG. 1). While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   performing a first hashing operation to compute a first hash value, wherein an input to the first hashing operation comprises a first message;
   storing the first hash value in a plurality of output registers;
   storing a second message in a plurality of input registers;
   performing a first iteration of a second hashing operation, wherein an input to the second hashing operation comprises the second message and the first hash value;
   determining that a first portion of the second message, stored in a first register of the plurality of input registers, has been processed in course of the second hashing operation; and
   moving a first portion of the first hash value stored in a first register of the plurality of output registers to the first register of the plurality of input registers.

2. The method of claim 1, further comprising:
   moving a second portion of the first hash value stored in a second register of the plurality of output registers to the first register of the plurality of output registers.

3. The method of claim 2, further comprising:
   performing a second iteration of the second hashing operation;
   determining that a second portion of the second message, stored in a second register of the plurality of input registers, has been processed in course of the second hashing operation;
   moving the first portion of the first hash value from the first register of the plurality of input registers to the second register of the plurality of input registers; and
   moving the second portion of the first hash value stored in the first register of the plurality of output registers to the first register of the plurality of input registers.

4. The method of claim 2, wherein moving the second portion of the first hash value stored in the second register of the plurality of output registers to the first register of the plurality of output registers comprises outputting an enable signal to a multiplexer to shift a value stored in the second register to the first register.

5. The method of claim 1, wherein at least one of the first hashing operation or the second hashing operation comprises a secure hash algorithm (SHA), wherein the SHA is one of SHA-256, SHA-384, or SHA-512.

6. The method of claim 1, wherein the first hashing operation and the second hashing operation are consecutive stages of a Keyed-Hash Message Authentication Code (HMAC).

7. The method of claim 1, further comprising storing a second hash value in the plurality of output registers, wherein the second hash value is an output of the second hashing operation.

8. The method of claim 1, wherein the first message is stored in the plurality of input registers.

9. The method of claim 8, wherein the first message comprises a cryptographic key.

10. The method of claim 9, wherein the first message further comprises padding.

11. A system comprising:
    a plurality of input registers;
    a plurality of output registers; and
    a processing device, operatively coupled with the plurality of input registers and the plurality of output registers, the processing device to:
      perform a first hashing operation to compute a first hash value, wherein an input to the first hashing operation comprises a first message;
      store the first hash value in the plurality of output registers;
      store a second message in the plurality of input registers;
      perform a first iteration of a second hashing operation, wherein an input to the second hashing operation comprises the second message and the first hash value;
      determine that a first portion of the second message, stored in a first register of the plurality of input registers, has been processed in course of the second hashing operation; and move a first portion of the first hash value stored in a first register of the plurality of output registers to the first register of the plurality of input registers.

12. The system of claim 11, wherein the processing device is further to:
move a second portion of the first hash value stored in a second of the plurality of output registers to the first register of the plurality of output registers.

13. The system of claim 12, wherein the processing device is further to:
perform a second iteration of the second hashing operation;
determine that a second portion of the second message, stored in a second register of the plurality of input registers, has been processed in course of the second hashing operation;
move the first portion of the first hash value from the first register of the plurality of input registers to the second register of the plurality of input registers; and
move the second portion of the first hash value stored in the first register of the plurality of output registers to the first register of the plurality of input registers.

14. The system of claim 11, wherein at least one of the first hashing operation or the second hashing operation comprises a secure hash algorithm (SHA), wherein the SHA is one of SHA-256, SHA-384, or SHA-512.

15. The system of claim 11, wherein the first hashing operation and the second hashing operation are consecutive stages of a Keyed-Hash Message Authentication Code (HMAC).

16. The system of claim 11, wherein the processing device is further to store a second hash value in the plurality of output registers, wherein the second hash value is an output of the second hashing operation.

17. A non-transitory computer readable medium comprising data that, when accessed by a processing device, cause the processing device to:
perform a first hashing operation to compute a first hash value, wherein an input to the first hashing operation comprises a first message;
store the first hash value in a plurality of output registers;
store a second message in a plurality of input registers;
perform a first iteration of a second hashing operation, wherein an input to the second hashing operation comprises the second message and the first hash value;
determine that a first portion of the second message, stored in a first register of the plurality of input registers, has been processed in course of the second hashing operation; and
move a first portion of the first hash value stored in a first register of the plurality of output registers to the first register of the plurality of input registers.

18. The non-transitory computer readable medium of claim 17, wherein the data is further cause the processing device to:
move a second portion of the first hash value stored in a second of the plurality of output registers to the first register of the plurality of output registers.

19. The non-transitory computer readable medium of claim 18, wherein the data is further cause the processing device to:
perform a second iteration of the second hashing operation;
determine that a second portion of the second message, stored in a second register of the plurality of input registers, has been processed in course of the second hashing operation;
move the first portion of the first hash value from the first register of the plurality of input registers to the second register of the plurality of input registers; and
move the second portion of the first hash value stored in the first register of the plurality of output registers to the first register of the plurality of input registers.

20. The non-transitory computer readable medium of claim 17, wherein at least one of the first hashing operation or the second hashing operation comprises a secure hash algorithm (SHA), wherein the SHA is one of SHA-256, SHA-384, or SHA-512.

* * * * *